(12) United States Patent
Mukherjee et al.

(10) Patent No.: US 7,269,727 B1
(45) Date of Patent: Sep. 11, 2007

(54) SYSTEM AND METHOD FOR OPTIMIZING AUTHENTICATION IN A NETWORK ENVIRONMENT

(75) Inventors: Arghya T. Mukherjee, Mountain View, CA (US); Hancang Wang, San Jose, CA (US); Renhua Wen, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 767 days.

(21) Appl. No.: 10/639,053

(22) Filed: Aug. 11, 2003

(51) Int. Cl.
H04L 9/32 (2006.01)
H04L 12/66 (2006.01)
H04M 1/66 (2006.01)
G06F 15/173 (2006.01)
H04L 9/00 (2006.01)

(52) U.S. Cl. .............. 713/160; 713/161; 713/168; 370/401; 370/420; 455/410; 455/411; 709/225; 707/100

(58) Field of Classification Search ........ 713/160–161, 713/168; 370/401, 420; 455/410, 411; 709/225; 707/100
See application file for complete search history.

(56) References Cited

U.S. PATENT DOCUMENTS

| | | | |
|---|---|---|---|
| 6,282,658 B2 | 8/2001 | French et al. | 713/201 |
| 6,418,466 B1 | 7/2002 | Bertram et al. | 709/221 |
| 6,427,209 B1 | 7/2002 | Brezak, Jr. et al. | 713/201 |
| 6,463,474 B1 | 10/2002 | Fuh et al. | 709/225 |
| 6,496,936 B1 | 12/2002 | French et al. | 713/201 |
| 6,563,919 B1 | 5/2003 | Aravamudhan et al. | 379/230 |
| 6,584,310 B1 | 6/2003 | Berenzweig | 455/432 |
| 6,636,894 B1* | 10/2003 | Short et al. | 709/225 |
| 6,741,853 B1* | 5/2004 | Jiang et al. | 455/418 |
| 6,810,259 B1* | 10/2004 | Zhang | 455/456.5 |
| 6,925,560 B1* | 8/2005 | Basquin | 713/169 |
| 7,103,784 B1* | 9/2006 | Brown et al. | 726/9 |
| 7,194,764 B2* | 3/2007 | Martherus et al. | 726/8 |
| 2001/0016492 A1* | 8/2001 | Igarashi et al. | 455/433 |
| 2002/0018456 A1* | 2/2002 | Kakemizu et al. | 370/338 |
| 2003/0079144 A1* | 4/2003 | Kakemizu et al. | 713/200 |
| 2003/0145091 A1* | 7/2003 | Peng et al. | 709/229 |
| 2006/0114897 A1* | 6/2006 | Suri | 370/389 |

OTHER PUBLICATIONS

Cisco, Single-User Network Access Security TACACS+; Mar. 30, 1995, 9 pages.*

* cited by examiner

Primary Examiner—Emmanuel L. Moise
Assistant Examiner—Minh Dieu Nguyen
(74) Attorney, Agent, or Firm—Baker Botts L.L.P.

(57) ABSTRACT

A method for executing authentication in a network environment is provided that includes retrieving a group profile from an authentication, authorization, and accounting (AAA) server in response to receiving a request from a first end user and locally caching the group profile. A service may be provided to the first end user based on information included within the group profile and associated with the first end user. A request may be received from a second end user. It is then determined if the second end user is included within the group profile such that in cases where the second end user is included in the group profile the group profile can be locally cached in order to provide a service to the second end user without having to communicate with the AAA server.

22 Claims, 2 Drawing Sheets

SYSTEM AND METHOD FOR OPTIMIZING AUTHENTICATION IN A NETWORK ENVIRONMENT

TECHNICAL FIELD OF THE INVENTION

This invention relates in general to the field of communications and, more particularly, to a system and a method for optimizing authentication in a network environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to authenticate an entity via a network, whereby an end user or an object may initiate a tunneling protocol by invoking a selected location or a designated network node. The network node or selected location may then provide a platform that the end user may use to conduct a communication session.

As the subscriber base of end users increases, proper routing, effective authentication, and efficient management of communication sessions and data flows becomes even more critical. In certain cases, scalability and centralized control may be achieved for a corresponding network, but only at the expense of time and performance. In other scenarios, performance may be acceptable, but only at the expense of restricted scalability and the lack of management control. Accordingly, the ability to provide an effective mechanism to optimally authenticate an end user/mobile terminal, while offering acceptable scalability and management features, provides a significant challenge to network operators, component manufacturers, and system designers.

SUMMARY OF THE INVENTION

From the foregoing, it may be appreciated by those skilled in the art that a need has arisen for an improved communications approach that provides for an optimal and robust authentication procedure. In accordance with one embodiment of the present invention, a system and method for optimizing authentication in a network environment are provided that greatly reduce disadvantages and problems associated with conventional authentication techniques.

According to one embodiment of the present invention, there is provided a method for providing authentication in a network environment that includes retrieving a group profile from an authentication, authorization, and accounting (AAA) server in response to receiving a request from a first end user and locally caching the group profile. A service may be provided to the first end user based on information included within the group profile and associated with the first end user. A request may be received from a second end user. It is then determined if the second end user is included within the group profile such that in cases where the second end user is included in the group profile the group profile can be locally cached in order to provide a service to the second end user without having to communicate with the AAA server.

Certain embodiments of the present invention may provide a number of technical advantages. For example, according to one embodiment of the present invention a communications approach is provided that allows for smaller call setup times and reduced network traffic. This is in contrast to other approaches the continuously retrieve an end user's profile from a corresponding AAA server. Thus, the ability to cache a profile locally offers the ability to quickly identify an end user without having to traverse a portion of the network in order to query the AAA server each time a new end user makes contact with the packet gateway.

Yet another technical advantage associated with one embodiment of the present invention relates to its scalability. The present invention provides greater flexibility than other approaches associated with a limited local configuration, providing a network-to-realm mapping on the packet gateway. In contrast to this approach, the present invention may include a group profile that may be shared by multiple users having a similar characteristic, e.g. common network digits. Thus, the number of such profiles that may need to be cached on the packet gateway (and thereby the memory overhead) would be small. Accordingly, more end users may be accommodated, while consuming minimal network resources and occupying nominal space in associated components. Moreover, such a communications approach would not necessarily require any changes to existing mobile clients or legacy network components, architectures, and devices (e.g. an AAA server). Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
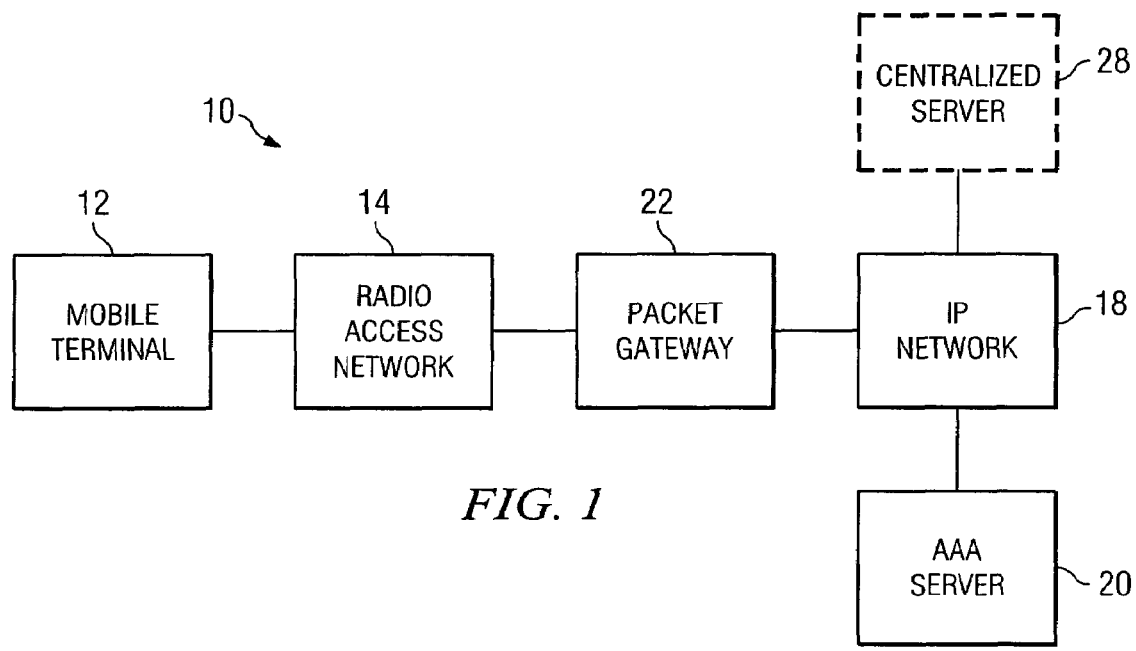
FIG. 1 is a simplified block diagram of a communications system for optimizing an authentication operation in a network environment in accordance with one embodiment of the present invention.

FIG. 1 is a simplified block diagram of a communication system 10 for communicating data in a network environment. Communication system 10 may include a mobile terminal 12, a radio access network (RAN) 14, and an Internet protocol (IP) network 18. Additionally, communication system 10 may include an authentication, authorization, and accounting (AAA) server 20, a packet gateway 22 coupled to RAN 14 and IP network 18, and a centralized server 28, which may be optionally included in such an architecture. FIG. 1 may be generally configured or arranged to represent a 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes authentication operations or procedures.

This may be inclusive of first generation, 2G, and 3G architectures that provide features for authenticating end users.

In accordance with the teachings of the present invention, communication system 10 provides a platform in which to execute an authentication procedure, for example, in the context of the absence of an authentication operation being performed on a corresponding packet gateway 22. Thus, communication system 10 may cache selected profiles of groups of end users 'locally' on packet gateway 22. This allows packet gateway 22 to treat a given profile as if it was local for a significant portion of most call setups, while still allowing the flexibility of configuring the group profiles on AAA server 20.

Communication system 10 further provides a method to optimize network access identifier (NAI) construction to support realm and user attribute retrieval from an external source (e.g. AAA server 20) while having a lower average call setup time. This is achieved through caching the profile retrieved from AAA server 20 on packet gateway 22. When packet gateway 22 determines that a user is an unauthenticated user, it first searches a local cache for a group profile associated with the network digits (for example) of the end user's telephone number or mobile station identifier (MSID). [Note that as used herein, the terms "MSID" and 'telephone number' may be used interchangeably.] If the profile is found, packet gateway 22 may check to see if the profile is valid or if it has expired.

If the profile has either expired, or is not in the cache, packet gateway 22 may then purge or expunge the expired profile and request the corresponding profile from AAA server 22. The profile may then be cached, whereby its expiration time is marked. The maximum age of the profile may be set by an attribute in the profile itself, or be pre-configured on packet gateway 22. By associating an expiration time with a given profile, it is ensured that stale profiles are systematically updated by packet gateway 22.

Once a valid profile is placed in the cache, all other users that belong to the same group (e.g. network) can then be authorized with the realm, as well as other authorization attributes, without having to send a request to AAA server 20. Thus, using the example above for purposes of teaching only, both MSIDs 12345678901 and 12345678902 would have the same network of 12345, and therefore use (or be included in) the same group profile. Since the profiles are inherently group profiles, this would result in reducing a large number of AAA server accesses, and thereby network traversals. This would similarly reduce call setup time on packet gateway 22, and decrease network congestion. This is in contrast to other approaches that continuously retrieve an end user's profile from a corresponding AAA server. Thus, the ability to cache a profile locally offers the ability to quickly identify an end user (e.g. mobile terminal 12) without having to traverse a portion of the network in order to query AAA server 20 each time a new end user makes contact with packet gateway 22.

For purposes of teaching, it is helpful to provide some overview of the way in which an authentication protocol functions. This description is offered for purposes of example only and should not be construed in any way to limit the principles and features of the present invention. Code division multiple access (CDMA) standards may allow ends users (e.g. mobile terminal 12) associated with a packet gateway (e.g. a packet data serving node (PDSN)) to refuse Point-to-Point Protocol (PPP) authentication, provided that NAI construction is performed by the PDSN. This involves the extraction of a realm (e.g. ispxyz.com) and by pre-pending the digits of the user's MSID to the realm. This may be separated by an "@." For example, MSID 12345678901, if determined to have the realm "ispxyz.com," would have the constructed NAI of 12345678901@ispxyz.com. The constructed NAI may be used for accounting, and be used in place of the NAI that would have been received by the PDSN had PPP authentication been performed. The realm may be determined based on the network digits: the first 'n' digits of the user's MSID, where n is determined by, for example, a network operator. In the example above, if n is five, then the digits would be 12345.

Two approaches are generally used to determine the network digits to realm mapping. The mapping between the network digits of the MSID and the realm may either be configured locally on, for example, a PDSN, or be retrieved from a given AAA server. The former approach may be faster because it does not require a request to be made to an external AAA server for every un-authenticated user. However, the latter approach may be more scalable and flexible because it allows the operator to configure the profile containing the realm at a single place in the network, instead of on multiple PDSNs. It may also allow more network specific attributes (e.g. PPP timers, access control lists, compression parameters, etc.) to be configured in the profile. Thus, a tradeoff exists between performance and provisioning ease. One strategy may be faster, yet lacking in scalability and manageability. Conversely, another strategy may be more efficient for management purposes, but lacking in speed and more apt to cause traffic congestion.

Communication system 10 offers greater flexibility than other approaches that offer a local configuration, by providing a network-to-realm mapping on a given packet gateway. In contrast to this approach, communication system 10 may include a group profile that may be shared by multiple users with the same network digits. Thus, the number of such profiles that may need to be cached on packet gateway 22 (and, thereby, the memory overhead) would be small. Accordingly, more end users may be accommodated, while consuming minimal network resources and occupying nominal space in associated components. Moreover, such a communications approach would not necessarily require any changes to mobile clients or network components and devices (e.g. AAA server 20). Additional details relating to the operation of communication system 10, as well as its potential applications, are provided below.

Mobile terminal 12 represents an end user, a client, or a customer wishing to initiate a communication in communication system 10 via IP network 18. Mobile terminal 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. Mobile terminal 12 may also be inclusive of a suitable interface to the human user, such as a microphone, a display, a keyboard, or other terminal equipment (such as, for example, an interface to a personal computer or to a facsimile machine in cases where mobile terminal 12 is used as a modem). Mobile terminal 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between mobile terminal 12 and packet gateway 22. RAN 14 may also be representative of terminal equipment (TE) (and accordingly these terms may be used interchangeable herein in this document) used to offer a communications platform or to provide connectivity to one or more mobile terminals 12. RAN 14 may comprise a base transceiver station and a base station controller in one embodiment. The communications interface provided by RAN 14 offers connectivity and allows data to be exchanged between mobile terminal 12 and any number of selected elements within communication system 10. RAN 14 may also facilitate the delivery of a request packet generated by mobile terminal 12 and the reception of information sought by mobile terminal 12. RAN 14 is only one example of a communications interface between mobile terminal 12 and packet gateway 22. Other types of communications interfaces may be used for any desired network design and based on particular needs.

IP network 18 represents a series of points or nodes of interconnected communication paths for receiving and transmitting packets of information that propagate through communication system 10. IP network 18 offers a communicative interface between mobile terminal 12 and selected locations within the network, such as AAA server 20 for example. IP network 18 may be representative of a service provider or be any suitable local area network (LAN), wireless local area network (WLAN), metropolitan area network (MAN), wide area network (WAN), virtual private network (VPN), or any other appropriate architecture or system that facilitates communications in a network environment. IP network 18 implements a user datagram protocol (UDP)/internet protocol (UDP/IP) communication language protocol in a particular embodiment of the present invention; however, IP network 18 may alternatively implement any other suitable communication protocol (e.g. transmission control protocol (TCP)/IP) for transmitting and receiving data or information within communication system 10.

Packet gateway 22 is a communications node or interface that provides a layer two or a layer three communications link, or a PPP link between mobile terminal 12 and IP network 18. Packet gateway 22 may also fill the role of a network access server (NAS), where appropriate, in providing layer two connectivity for a network. In a particular embodiment, packet gateway 22 is a PDSN providing access to the Internet, Intranets, WAP servers, VPNs, or any other elements operable to communicate with mobile terminal 12. Each PDSN may include suitable software in order to locally cache a group profile such that subsequent requests, which include an end user belonging to the group profile, do not need to traverse that network and be addressed by AAA server 20. The locally cache mechanism may include a suitable table that operates to store a plurality of group profiles that may be readily referenced by the PDSN (i.e. packet gateway 22). Alternatively, the PDSN or any of the alternative elements (included within the scope of packet gateway 22) offered below, may include any other suitable hardware, software, algorithms, components, devices, objects, modules, or elements operable to effectuate the operations of packet gateway 22 as explained fully herein.

Additionally, packet gateway 22 may provide an access gateway for mobile terminal 12. Packet gateway 22 may also provide a communications node between IP network 18 and mobile terminal 12. Packet gateway 22 may operate to authenticate, authorize, and provide an accounting functionality for information propagating through communication system 10, in locally caching profiles. The profiles may be retrieved from AAA server 20 or be routinely populated into packet gateway 22 in accordance with particular needs. Packet gateway 22 may also store (in addition to local caching operations) one or more profiles, where appropriate, associated with mobile terminal 12. The profiles may include information relating to user privileges, quality of service (QoS) parameters, access rights, or bandwidth allocation characteristics.

In another embodiment of the present invention, packet gateway 22 is a serving general packet radio service (GPRS) support node (SGSN) or a gateway GPRS support node (GGSN), providing a communications medium in a GPRS service network environment. Where communication system 10 is implemented in a GPRS environment, a series of IP network gateways may be provided and each may include a GGSN that works in conjunction with the SGSNs in communicating high-speed data exchanges within communication system 10. GPRS represents a packet-based data bearer service for communication services that may be delivered as a network overlay for any type of suitable network configuration or platform. GPRS generally applies packet-radio and packet switching principles to transfer data packets in an efficient way between GSM mobile stations and external packet data networks. GPRS may support multiple Internet communication protocols and may enable existing IP, X.25, or any other suitable applications or protocols to operate over GSM connections.

AAA server 20 is a server program that receives end user/mobile terminal requests for access to networking equipment or resources. 'Networking resources' refers to any device, component, or element that provides some functionality to, for, or on behalf of mobile terminal 12. AAA server does not necessarily need to be modified or upgraded in order to interface properly with packet gateway 22 in functioning in communication system 10 as described fully herein. AAA server 20 may be queried by packet gateway 22 and return requested profiles to packet gateway 22 such that it can locally cache information and not contact AAA server 20 every time another end user seeks authentication. AAA server 20 also provides a central point of management for a network administrator or operator such that any suitable administration or control may be effectuated at a single node. AAA server 20 may be populated in any suitable manner and updated in any appropriate fashion in accordance with particular needs.

AAA server 20 may also provide AAA services and management for a corresponding network. Authorization generally refers to the process of giving mobile terminal 12 permission to do or to access something. In multi-user computer systems, a system administrator may define for the system which end users are allowed access to given locations in the system and, further, what privileges are provided for a given end user (i.e. mobile terminal 12). Once mobile terminal 12 has logged into a network, such as for example IP network 18, the network may wish to identify what resources mobile terminal 12 is given during the communication session. Thus, authorization within communication system 10 may be seen as both a preliminary setting up of permissions by a system administrator and the actual checking or verification of the permission values that have been set up when mobile terminal 12 is attempting access to a selected area. Authentication generally refers to the process of determining whether mobile terminal 12 is in fact who or what it is declared to be. In the case of private or public computer networks, authentication may be done through the use of unique identification elements such as a user identity or log-on passwords. Knowledge of the password offers a presumption that mobile terminal 12 is authentic. Accounting generally refers to financial or session information associated with each mobile terminal 12 or each network and may additionally include trafficking information, session timing information, data transfer statistics, or information relating to other information flows within communication system 10.

AAA server 20 may receive an IP address associated with mobile terminal 12 and other parameters from any suitable network source, or alternatively from a dynamic host configuration protocol (DHCP) server or a domain name system (DNS) database element, in order to direct data to be communicated to mobile terminal 12. AAA server 20 may include any suitable hardware, software, component, or element that operates to receive data associated with mobile terminal 12 and provide corresponding AAA-related functions to network components within communication system 10.

In an alternative embodiment of the present invention, communication system 10 may be implemented with any other suitable server (used to supplant AAA server 20) or with any other passive (or incidental) server or element that replaces AAA server 20 and operates as another network element. Additionally, communication system 10 may be configured without AAA server 20 in accordance with the teachings of the present invention. In such an arrangement, other suitable intra-communications between various elements within communication system 10 may be executed in the absence of AAA server 20 in accordance to particular needs. For example, AAA server 20 may be replaced with centralized server 28 that may perform similar operations to those being performed by AAA server 20. Note that either of these elements (AAA server 20 or centralized server 28) may operate independently or cooperate with each other where appropriate. Additionally, either element may be removed from communication system 10: provided that packet gateway 22 is offered some location from which to retrieve one or more group profiles.

Centralized server 28 is a communications element having data storage capabilities for storing one or more end user profiles associated with clients or customers in the network. The end user profiles (stored by AAA server 20 or centralized server 28) may contain any appropriate parameters or characteristics of mobile terminal 12 that may affect treatment of communications links, tunnels, or sessions. As identified above, each profile may include data reflecting bandwidth allocation parameters and/or information relating to QoS characteristics designated for mobile terminal 12. Centralized server 28 (or AAA server 20) may also provide a point of management to a service provider (or any other entity) in order to control one or more operations associated with mobile terminal 12. Where appropriate, any of the information stored on centralized server 28 may be alternatively stored within packet gateway 22.

Each of AAA server 20, packet gateway 22, or centralized server 28 may glean information from requests, data segments, or hyper-text transfer protocol (HTTP) elements to identify a source associated with a packet propagating through communication system 10. The identification of the source may provide a correlation between mobile terminal 12 and a corresponding profile. For example, AAA server 20, packet gateway 22, or centralized server 28 may learn about mobile terminal 12 through RADIUS packet inspection. Alternatively, the source may be learned through diameter communication protocols, terminal access controller access system (TACACS) protocols, or any other communications protocols used in any suitable network applications. TACACS represents an industry standard protocol specification, RFC 1492, that generally forwards username and password information to an appropriate network node. Either AAA server 20, packet gateway 22, or centralized server 28 may operate as a TACACS database or a database using a UNIX password file with TACACS protocol support. For example, the UNIX server with TACACS may pass requests to the UNIX database and send the accept or reject message back to an access server. AAA server 20, packet gateway 22, or centralized server 28 may also perform any necessary decrypting protocols or other suitable transformations, where appropriate, as a request packet propagates through communication system 10.

Both AAA server 20 or centralized server 28 may also include a table for properly storing one or more end user profiles to be used in routing information or data in communication system 10. The table may be populated in a variety of ways. For example, when mobile terminal 12 connects to the network, a RADIUS request is made on its behalf by a NAS or any other appropriate device. In a mobile networking scenario, this request, potentially referred to as an Access-Request, may contain the user-ID in the User-Name attribute or in the calling station-ID attribute, which uniquely identifies which end user is requesting the information from the network. If AAA server 20 authenticates and authorizes mobile terminal 12 successfully, a RADIUS Access-Accept message may be communicated back to the RADIUS client with an IP address in the framed-IP address attribute. This IP address may be the address used by mobile terminal 12 when it sends an IP packet. Either AAA server 20 or centralized server 28 may inspect the RADIUS packets exchanged and build a table that binds a user-ID with an assigned IP address. Entries within the table may be cleaned up, deleted, or updated periodically (or alternatively updated or changed based on some event or modification to system parameters) in order to accurately reflect one or more source profiles associated with one or more mobile terminals 12. Entries could also be deleted specifically or deleted per communications flow. In the case of RADIUS messaging, the population of the table may be controlled by RADIUS accounting messages or by any other suitable populating protocol according to particular needs.

Figure 2:
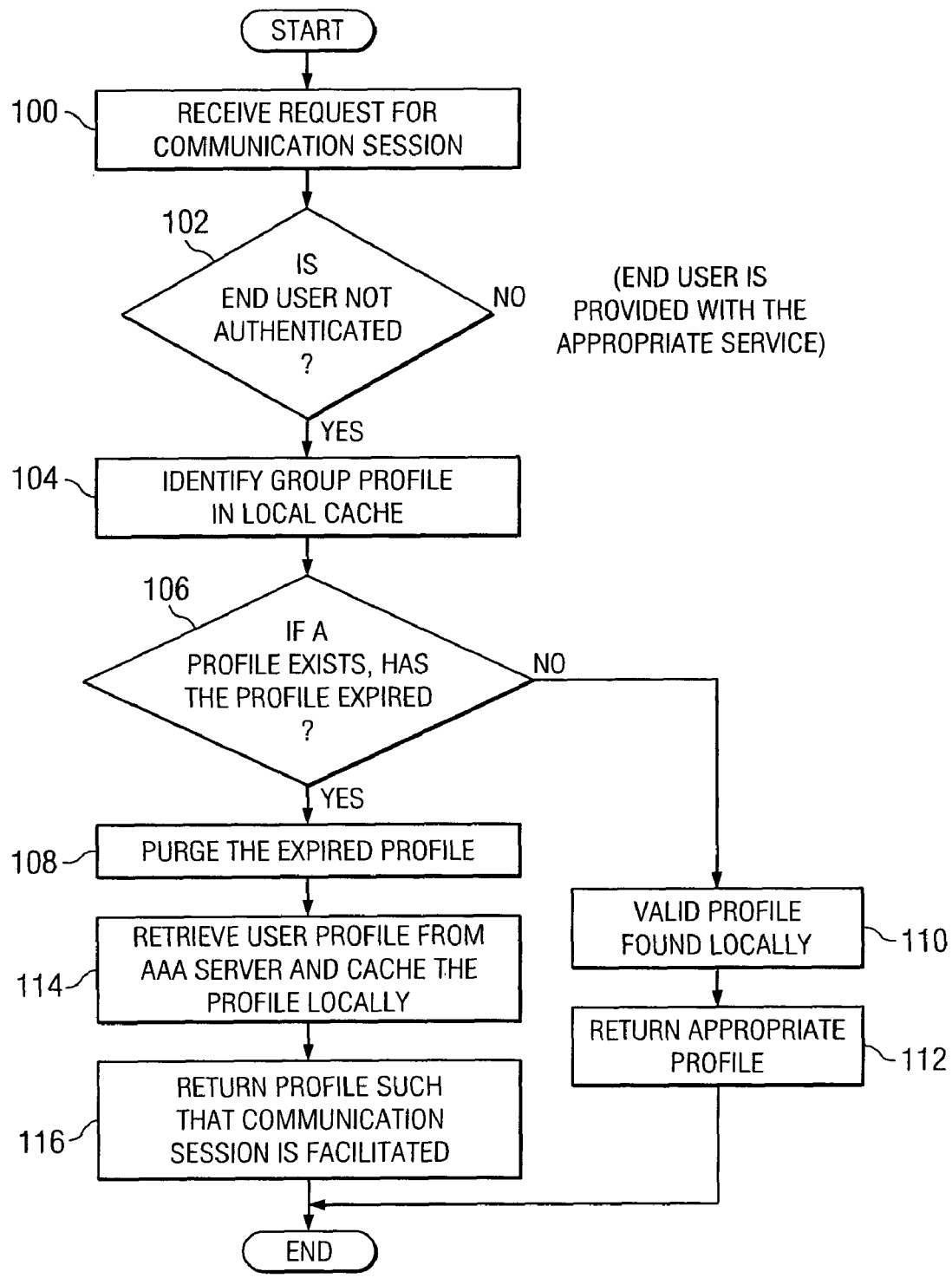
FIG. 2 is a flowchart illustrating a series of example steps associated with a method for executing an authentication operation in a network environment.

FIG. 2 is a simplified flowchart illustrating a series of example steps associated with a method for providing an authentication operation in a network environment. The method begins at step 100 where a first mobile terminal may communicate a request for a communication session. At step 102, packet gateway 22 may determine if the first mobile terminal is authenticated. At step 104, the group profile that includes the first mobile terminal (or end user) may be identified in the local cache. If the profile is found and it has expired (step 106), the profile may be deleted, expunged, or otherwise removed at step 108. Where a valid profile is found at step 110 (in the local cache) the appropriate profile may be returned at step 112 and the corresponding service provided to the first end user.

If the profile is not found at step 110, packet gateway 22 may query AAA server 20 to retrieve the appropriate profile at step 114 such that the profile may be cached locally. At step 116, the appropriate group profile may be returned from AAA server 20 such that the communication session is facilitated. Thus, when a second end user/mobile terminal initiates contact with packet gateway 22, packet gateway 22 may respond by immediately authenticating the second end user in cases where the second end user is part of the same group as the first end user. In other cases, where the appropriate group cannot be found at packet gateway 22, a request may be made to AAA server 20 in order to retrieve the appropriate group profile.

Some of the steps illustrated in FIG. 2 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to IP communications, communication system 10 may be used for any tunneling protocol involving authentication in a network environment. Any suitable communications that involve an authentication operation or process may benefit from the teachings of the present invention. The use of mobile terminal 12 and IP communications have only been offered for purposes of teaching and should not be construed to limit the scope of the present invention in any way. Moreover, communication system 10 may be applicable to any scenario in which a profile is sought to be retrieved in order to identify an end user. Profiles may by suitably set up by a network operator and based on any characteristic or feature. The use of prefixes in the context of an MSID/telephone number has been used for purposes of example and teaching only. Accordingly, this may be replaced by an suitable identifying or distinguishing element conducive to performing similar operations.

In addition, communication system 10 may be extended to any scenario in which mobile terminal 12 is provided with an authentication capability (in the context of a wired or a wireless connection or coupling) and communicates with some type of access server (e.g. a NAS, foreign agents, etc.). Mobile terminal 12 may use a dedicated connection of some form or use forms of multiple access protocols where appropriate. Access may be associated with PPP or alternatively with layer three protocols over an L2 layer in accordance with particular needs. Such an embodiment may include any suitable tunnel terminators and/or tunnel initiators.

Moreover, although communication system 10 has been illustrated with reference to particular authentication protocols, these protocols may be replaced by any suitable authentication processes or mechanisms. For example, communication system 10 may be used with a challenge authentication protocol (CHAP), password authentication protocol (PAP), an extensible authentication protocol (EAP), or any other suitable authentication protocol where appropriate and in accordance with particular needs. References or implied statements associated with a particular authentication protocol are arbitrary and have been used for purposes of example and teaching only and, accordingly, should be construed as such.

Additionally, communication system 10 may be used in a host of communications environments, such as for example in conjunction with a CDMA network. In a CDMA environment, all users of the CDMA system use the same carrier spectrum and may transmit simultaneously. Each user may have his own pseudo-random code word. Whenever a user of CDMA seeks to transmit, an associated system may correlate a message signal with the code word. The receiver performs decorrelation on the received signal. For detection of the message signal, the receiver identifies the code word used by the transmitter. Because many users of the CDMA system share the same frequency, CDMA systems could benefit from the teachings of the present invention in providing an accurate and efficient authentication protocol for information packets generated by mobile terminal 12. IS-95 may also utilize the CDMA scheme in conjunction with the present invention.

Time division multiple access (TDMA) represents another protocol in which the disclosed configuration of communication system 10 may be implemented. In a TDMA access scheme, a group of mobile terminals 12 are multiplexed over the time domain, i.e. user U1 uses radio frequency F1 for time period T1 after which user U2 uses the same frequency F1 for time T1 and so on. The time axis is divided into equal length time slots. In TDMA, each user occupies a cyclically repeating time slot defining a channel with N time slots making up a frame. In using TDMA, it is possible to allocate different numbers of time slots per frame to different end users. Thus bandwidth can be supplied on demand to different users depending on user needs. GSM and the IS-54/IS-136-based United States Digital Cellular (USDC) system are some of the standards that may use TDMA in conjunction with the present invention. The authentication approach for request packets propagating through communication system 10, may be implemented in a TDMA system in order to accurately identify mobile terminal 12.

Frequency division multiple access (FDMA) represents another communications environment in which communication system 10 may be employed. The FDMA system assigns individual frequency channels or bands to individual users whereby all users may transmit at the same time. These channels are assigned on demand to users requesting service. During the call no other user can share the same frequency band. A FDMA channel carries only one communications exchange or session, e.g. phone call, at a time. One or more mobile terminals 12, which may be used in conjunction with a FDMA system, may implement duplexers because both the transmitter and receiver operate at the same time. The Advanced Mobile Phone Service (AMPS) and the European Total Access Communication System (ETACS) represent some example standards that may use FDMA in conjunction with the source identification approach of the present invention.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for executing authentication in a network environment, comprising:

a packet gateway operable to retrieve a group profile from an authentication, authorization, and accounting (AAA) server in response to receiving a request from a first end user and to locally cache the group profile, wherein the packet gateway determines if the first end user is authenticated and if the first end user is unauthenticated, then the packet gateway searches a local cache for the group profile associated with network digits of the first end user's mobile station identifier (MSID), whereby if the group profile is not in the local cache or has expired, then the packet gateway purges the expired group profile and requests the group profile from the AAA server, caches the group profile, and marks an expiry time that is provided within the group profile, once the group profile is in the cache, subsequent users that belong to a same group can be authorized with a realm and with authorization attributes and without involving the AAA server, the packet gateway being operable to provide a service to the first end user based on information included within the group profile and associated with the first end user, wherein the packet gateway is further operable to receive a request from a second end user and to determine if the second end user is included within the group profile such that in cases where the second end user is included in the group profile the packet gateway can locally cache the group profile in order to provide a service to the second end user without having to communicate with the AAA server.

2. The apparatus of claim 1, wherein the group profile includes a plurality of end users that share a common prefix associated with their mobile station identifiers (MSIDs).

3. The apparatus of claim 1, wherein if the second end user is not in the group profile associated with the first end user, then the packet gateway may initiate a request to the AAA server in order to attempt to identify a profile associated with the second end user.

4. The apparatus of claim 1, wherein if the group profile associated with first end user has expired, the packet gateway may initiate a request to the AAA server for a valid profile that corresponds to the first end user.

5. The apparatus of claim 1, wherein each group profile includes an expiration time such that if the group profile is identified as having expired, it may be expunged.

6. The apparatus of claim 1, further comprising:
a centralized server operable to store a plurality of group profiles and to return requested group profiles to the packet gateway so that they can be locally cached.

7. The apparatus of claim 1, wherein the packet gateway includes a table operable to store one or more group profiles that may be locally cached.

8. A method for executing authentication in a network environment, comprising:
retrieving a group profile from an authentication, authorization, and accounting (AAA) server in response to receiving a request from a first end user;
locally caching the group profile;
providing a service to the first end user based on information included within the group profile and associated with the first end user, wherein the packet gateway determines if the first end user is authenticated and if the first end user is unauthenticated, then the packet gateway searches a local cache for the group profile associated with network digits of the first end user's mobile station identifier (MSID), whereby if the group profile is not in the local cache or has expired, then the packet gateway purges the expired group profile or requests the group profile from the AAA server, caches the group profile, and marks an expiry time that is provided within the group profile, once the group profile is in the cache, subsequent users that belong to a same group can be authorized with a realm and with authorization attributes and without involving the AAA server;
receiving a request from a second end user; and
determining if the second end user is included within the group profile such that in cases where the second end user is included in the group profile the group profile can be locally cached in order to provide a service to the second end user without having to communicate with the AAA server.

9. The method of claim 8, wherein the group profile includes a plurality of end users that share a common prefix associated with their mobile station identifiers (MSIDs).

10. The method of claim 8, wherein if the second end user is not in the group profile associated with the first end user, then a request is communicated to the AAA server in order to attempt to identify a profile associated with the second end user.

11. The method of claim 8, wherein if the group profile associated with first end user has expired, a request may be communicated to the AAA server for a valid profile that corresponds to the first end user.

12. The method of claim 8, further comprising:
storing a plurality of group profiles; and
returning requested group profiles such that they can be locally cached.

13. A system for executing authentication in a network environment, comprising:
means for retrieving a group profile from an authentication, authorization, and accounting (AAA) server in response to receiving a request from a first end user;
means for locally caching the group profile;
means for providing a service to the first end user based on information included within the group profile and associated with the first end user, wherein the packet gateway determines if the first end user is authenticated and if the first end user is unauthenticated, then the packet gateway searches a local cache for the group profile associated with network digits of the first end user's mobile station identifier (MSID), whereby if the group profile is not in the local cache or has expired, then the packet gateway purges the expired group profile or requests the group profile from the AAA server, caches the group profile, and marks an expiry time that is provided within the group profile, once the group profile is in the cache, subsequent users that belong to a same group can be authorized with a realm and with authorization attributes and without involving the AAA server;
means for receiving a request from a second end user; and
means for determining if the second end user is included within the group profile such that in cases where the second end user is included in the group profile the group profile can be locally cached in order to provide a service to the second end user without having to communicate with the AAA server.

14. The system of claim 13, wherein the group profile includes a plurality of end users that share a common prefix associated with their mobile station identifiers (MSIDs).

15. The system of claim 13, wherein if the second end user is not in the group profile associated with the first end user, then a request is communicated to the AAA server in order to attempt to identify a profile associated with the second end user.

16. The system of claim 13, wherein if the group profile associated with first end user has expired, a request may be communicated to the AAA server for a valid profile that corresponds to the first end user.

17. The system of claim 13, further comprising:
means for storing a plurality of group profiles; and means for returning requested group profiles such that they can be locally cached.

18. Software for executing authentication in a network environment, the software being embodied in a computer readable medium and comprising computer code such that when executed is operable to:

retrieve a group profile from an authentication, authorization, and accounting (AAA) server in response to receiving a request from a first end user;

locally cache the group profile;

provide a service to the first end user based on information included within the group profile and associated with the first end user, wherein the packet gateway determines if the first end user is authenticated and if the first end user is unauthenticated, then the packet gateway searches a local cache for the group profile associated with network digits of the first end user's mobile station identifier (MSID), whereby if the group profile is not in the local cache or has expired, then the packet gateway purges the expired group profile or requests the group profile from the AAA server, caches the group profile, and marks an expiry time that is provided within the group profile, once the group profile is in the cache, subsequent users that belong to a same group can be authorized with a realm and with authorization attributes and without involving the AAA server;

receive a request from a second end user; and determine if the second end user is included within the group profile such that in cases where the second end user is included in the group profile the group profile can be locally cached in order to provide a service to the second end user without having to communicate with the AAA server.

19. The computer readable medium of claim 18, wherein the group profile includes a plurality of end users that share a common prefix associated with their mobile station identifiers (MSIDs).

20. The computer readable medium of claim 18, wherein if the second end user is not in the group profile associated with the first end user, then a request is communicated to the AAA server in order to attempt to identify a profile associated with the second end user.

21. The computer readable medium of claim 18, wherein if the group profile associated with first end user has expired, a request may be communicated to the AAA server for a valid profile that corresponds to the first end user.

22. The computer readable medium of claim 18, wherein in the code is further operable to:

store a plurality of group profiles; and return requested group profiles such that they can be locally cached.

* * * * *